United States Patent
Lang et al.

(10) Patent No.: US 9,112,400 B2
(45) Date of Patent: Aug. 18, 2015

(54) METHOD FOR FORMING ELECTRODYNAMIC MACHINE INSULATED COILS

(75) Inventors: Nicholas G. Lang, Cincinnati, OH (US);
William R. Finley, Cincinnati, OH (US);
Willi Lutz, Wolframs-Eschenbach (DE);
Klaus Schäfer, Nürnberg (DE)

(73) Assignees: SIEMENS AKTIENGESELLSCHAFT, München (DE); SIEMENS INDUSTRY, INC, Alpharetta, GA (US)

( * ) Notice: Subject to any disclaimer, the term of this patent is extended or adjusted under 35 U.S.C. 154(b) by 775 days.

(21) Appl. No.: 12/836,939

(22) Filed: Jul. 15, 2010

(65) Prior Publication Data
US 2012/0011708 A1  Jan. 19, 2012

(51) Int. Cl.
| | |
|---|---|
| *H02K 15/04* | (2006.01) |
| *H02K 15/06* | (2006.01) |
| *H02K 15/10* | (2006.01) |
| *H02K 15/12* | (2006.01) |
| *H02K 3/32* | (2006.01) |

(Continued)

(52) U.S. Cl.
CPC ............... *H02K 15/04* (2013.01); *H02K 3/32* (2013.01); *H02K 3/48* (2013.01); *H02K 15/045* (2013.01);

(Continued)

(58) Field of Classification Search
CPC ... H02K 15/04; H02K 15/045; H02K 15/066; H02K 15/10; H02K 15/105; H02K 15/12; H02K 3/32; H02K 3/48; H01B 3/00; H01B 3/04; H01F 41/0616; Y10T 29/49009; Y10T 29/49071; Y10T 29/49073; Y10T 29/49194
USPC ......... 29/596, 605, 606, 868; 310/12.23, 179, 310/210, 203, 208; 174/120 R, 121 SR, 174/121 R
See application file for complete search history.

(56) References Cited

U.S. PATENT DOCUMENTS

| | | | |
|---|---|---|---|
| 3,048,651 A | * | 8/1962 | Howard et al. |
| 3,750,273 A | * | 8/1973 | Beddows |

(Continued)

FOREIGN PATENT DOCUMENTS

| | | |
|---|---|---|
| CH | 422970 | 4/1967 |
| JP | 55111647 A | 8/1980 |

(Continued)

OTHER PUBLICATIONS

PCT International Search Report mailed Jul. 23, 2012 corresponding to PCT International Application No. PCT/US2011/041609 filed Jun. 23, 2011.

*Primary Examiner* — A. Dexter Tugbang

(57) ABSTRACT

A method for manufacturing electrodynamic machine conductive coils, such as alternating current induction motor stator coils. A continuous strand of insulation coated wire is formed into a generally planar elongated closed loop having a circumference and an outer surface. Thereafter a permanent insulation layer is applied to the closed loop outer surface, preferably by spiral wrapping insulating tape about the circumference of the closed loop with a tape wrapping machine. The insulating tape has a catalytic chemical compound including at least one part of a multi-part epoxy resin. The closed loop is shaped into a rigid conductive coil by application pressure, in order to conform the coil to a desired profile. Application of the permanent insulation layer to the closed loop prior to its final shaping enables machine insulation taping over a larger portion of the coil circumference and reduces need for slower and more expensive hand taping.

17 Claims, 6 Drawing Sheets

(51) Int. Cl.
*H02K 3/48* (2006.01)
*H01B 3/00* (2006.01)
*H01B 3/04* (2006.01)
*H01F 41/06* (2006.01)

(52) U.S. Cl.
CPC .............. *H02K 15/066* (2013.01); *H02K 15/10* (2013.01); *H02K 15/105* (2013.01); *H02K 15/12* (2013.01); *H01B 3/00* (2013.01); *H01B 3/04* (2013.01); *H01F 41/0616* (2013.01); *Y10T 29/49009* (2015.01); *Y10T 29/49071* (2015.01); *Y10T 29/49073* (2015.01); *Y10T 29/49197* (2015.01)

(56) References Cited

U.S. PATENT DOCUMENTS

| | | | |
|---|---|---|---|
| 3,914,860 A | 10/1975 | Schuler | |
| 4,013,987 A * | 3/1977 | Foster | 310/208 X |
| 4,038,741 A | 8/1977 | Schuler | |
| 4,481,709 A | 11/1984 | McDermott | |
| 4,678,931 A | 7/1987 | Olsen et al. | |
| 4,870,742 A | 10/1989 | Roloff | |
| 4,918,801 A | 4/1990 | Schwarz et al. | |
| 5,115,556 A * | 5/1992 | Gavrilidis et al. | 29/596 |
| 5,463,291 A | 10/1995 | Carroll et al. | |
| 5,551,144 A | 9/1996 | Mantone et al. | |
| 5,722,153 A | 3/1998 | Holmes | |
| 6,536,093 B2 * | 3/2003 | Roberts et al. | 29/596 |
| 6,735,847 B2 | 5/2004 | Roberts et al. | |
| 6,836,204 B2 * | 12/2004 | Reid et al. | 29/605 X |

FOREIGN PATENT DOCUMENTS

| | | | |
|---|---|---|---|
| JP | 60160355 A | 8/1985 | |
| JP | 62114452 A | 5/1987 | |
| JP | 04245404 A * | 9/1992 | 29/605 |

* cited by examiner

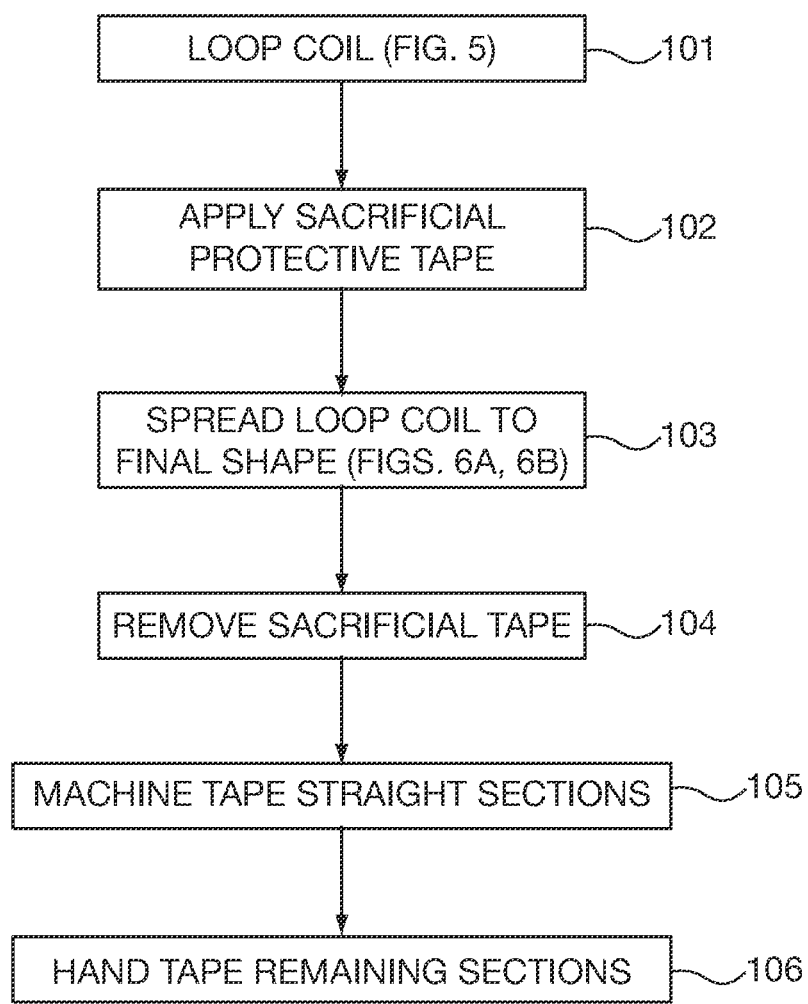

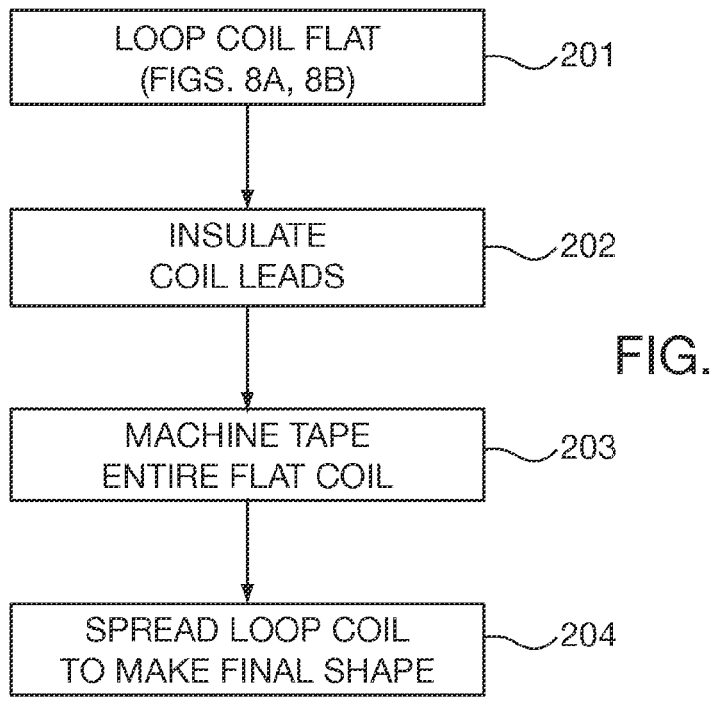
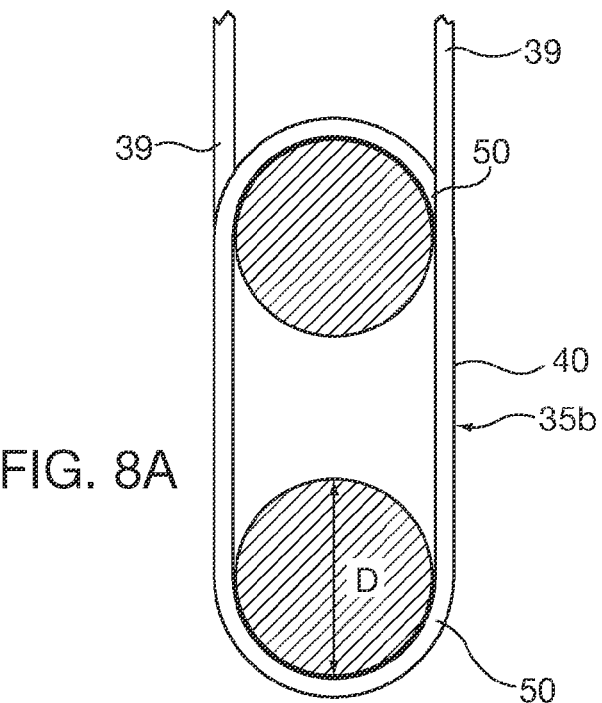

METHOD FOR FORMING ELECTRODYNAMIC MACHINE INSULATED COILS

BACKGROUND OF THE DISCLOSURE

1. Field of the Invention

The invention relates to methods for forming insulated coils for electrodynamic machines, and in particular stator coils suitable for alternating current (AC) induction motors. Coils formed by the present invention provide for machine winding of insulating tape about the coil circumference prior to bending and spreading the coil to its final, three-dimensional rigid configuration without the need for application and removal of temporary sacrificial protective tape as part of the spreading process. Application of the present invention method reduces the need for hand taping the coils after bending and shaping operations.

2. Description of the Prior Art

Electrodynamic machines generate electromagnetic forces (EMF) between a rotor and stator that are in relative motion. The general physical principles, construction and operation of AC motors is known to those skilled in the art. The exemplary known alternating current induction motor 20, shown in FIGS. 1 and 2, has a rotating rotor 25 and shaft 26. Torque generated on the rotating shaft 26 enables the motor 20 to perform useful work. A rotating magnetic field induced within poles formed within a stator ring 30 generates EMF that rotates the rotor 25 and shaft 26.

The AC induction motor 20 stator ring 30 has a stack of annularly shaped stator lamina 32 that form radial slots 33 extending generally axially from one end of the rotor to the other. The stator lamina radial slots 33 receive stator coils 35 that are arrayed in poles about the circumference of the stator ring 30. Application of current sequentially to the stator poles induces rotating magnetic fields in the stator ring 30. The induced EMF in turn causes rotation of the rotor 25 and shaft 26.

An exemplary known stator coil 35 is shown in FIGS. 3 and 3A. The stator coil 35 is a wound continuous conductive wire bundle that is formed into a three dimensional shape. The coil 35 has a pair of generally parallel straight sections 36A and 36B having respective generally rectangular cross sections that are oriented for insertion into the radial slots 33 formed by the stator ring lamina 32. In order to accomplish the desired radial orientation of the straight sections 36A and 36B within the radial slots 33, the coil 35 is formed with end portions 37A and 37B, often having a compound curve U-bends 38A and 38B. Leads 39 provided on the coil end portion 37A are coupled to an electric current power source. When current is applied to the leads 39, an electromagnetic field is induced within the coil. As is known by those skilled in the art, the continuous ribbon wire 40 forming the coil 35 has an insulating outer layer coating in order to optimize the magnetic field strength induced within the coil. The wire 40 is typically constructed of copper and coated with a resin or other electrically insulative layer that is thin relative to the wire dimensions.

As is well known in the art, individual stator coils 35 are electrically isolated from their surrounding environment by a circumferential insulation layer, often a multi-layered combination of tape and hardened resin. The insulating layer is applied using known techniques. In FIGS. 3 and 3A, the insulation layer 42 is depicted schematically as a spiral wrapped circumferential layer of tape 44 that is thereafter coated with a multi-part epoxy resin 46. Often stator coils are supplied to motor manufacturers with only the spiral wrapped tape layer 44, ready for application of the resin 46 by the motor manufacturer. Application of a resin coating over a wrapped coil is not part of the present invention and is not specifically claimed herein.

In the past, the stator coil insulation layer 42 was often applied after final forming of the coil wire bundle to its final intended shape. The earliest forms of tape insulation application were performed totally by hand. Later, cost savings were achieved by utilizing machine wound tape layers on the straight sections 36A and 36B. However, the compound curved end portions 37A and 37B and the coil leads 39 still needed to be tape-wrapped by hand labor. Hand taping is expensive, time consuming, and may be prone human error. Generally it has not been found practical to machine wind the compound curved end portions 37A and 37B, including the U-bends 38A and 38B, or the leads 39 after the coil is formed to its final intended configuration.

Generally it has been the opinion of those in the art that insulation should be applied to stator coils after completion of their forming operations, to prevent risk of insulation damage during the forming operations. In some instances, manufacturers have applied insulating tape to straight portions of the stator core wire bundles followed by application of a temporary sacrificial layer of protective tape, prior to their shaping/bending forming operations. The temporary sacrificial tape layer was thought to reduce likelihood of mechanical damage or abrasion on the insulated wire strand 40 and/or heat migration of melted resin from the tape during the high-pressure, elevated temperature forming steps. The temporary protective sacrificial tape layer then needed to be stripped from the formed coil after the formation steps. Thereafter the now fully formed stator coil was fully insulated by completion of insulating tape 44 wrapping operations and resin impregnation 46, using known techniques.

Thus, a need exists in the art for a method for forming electrodynamic machine coils that reduces taping operations, including temporary application of sacrificial tape during coil manufacture, and preferably replaces hand taping with machine taping operations. While it may not be feasible in all manufacturing operations to replace all hand taping with machine taping processes (for example, localized taping around stator coil leads), reduction of taping operations reduces costs and likelihood of taping errors in the eliminated extra steps.

SUMMARY OF THE INVENTION

Accordingly, an object of the invention is to reduce taping operations during electrodynamic machine coil manufacture; and preferably replace, where possible, hand taping procedures with machine taping procedures.

These and other objects are achieved in accordance with the present invention methods of forming electrodynamic machine coils, such as alternating current induction motor stator coils. In accordance with the present methods, at least one part of a multi-part resin impregnation system, specifically a catalytic material, is applied to a coil bundle prior to its final formation steps. The present method eliminates the need to apply protective tape temporarily to the coil wire bundle prior to its formation and thus eliminates the necessity to strip the protective tape before the formed coil is capable of receiving its final circumferential insulation tape layer.

By employing the coil formation methods of the present invention, the final insulating tape layer, including at least one part of a multi-part resin catalytic material, can be applied prior to the coil receiving its shaping and bending/forming operations. In this way the coil is provided with the insulation layer necessary for proper electrodynamic machine function.

The coil formation methods of the present invention enable machine taping of the coil bundles while they are in a relatively simple two-dimensional flat coil configuration. The flat, relatively gentle loop configuration of a two-dimensional flat coil is more receptive to consistent and reliable machine wrapping than the more complex compound bends of a fully formed stator coil loop after its formation operations during manufacture. Thus a manufacturer has the flexibility to wrap a larger percentage of the loop circumference with taping machines than would be otherwise possible using known prior techniques.

BRIEF DESCRIPTION OF THE DRAWINGS

The teachings of the present invention can be readily understood by considering the following detailed description in conjunction with the accompanying drawings, in which:

FIG. 4 is a flow chart of the prior art method of forming the stator coil of FIGS. 3 and 3A;

FIG. 7 is a flow chart of the present invention method of forming the stator coil of FIGS. 3 and 3A; and FIGS. 8A and 8B are respectively schematic plan and elevational views of an intermediate manufacture, step for formation of a stator coil made by the method of the present invention of FIG. 7, prior to application of a final insulation layer and final three-dimensional forming/bending operations necessary to construct the finished product of FIGS. 3 and 3A.

To facilitate understanding, identical reference numerals have been used, where possible, to designate identical elements that are common to the figures.

DETAILED DESCRIPTION

After considering the following description, those skilled in the art will clearly realize that the teachings of the present invention can be readily utilized in methods for formation of electrodynamic machine insulated coils, such as for example those utilized as stator coils in alternating current induction motors. As one skilled in the art can appreciate, the coil formation methods of the present invention can also be utilized in other types of electrodynamic machines, including direct current motors and generators.

It is noted at the outset that the present invention is directed to methods for forming electrodynamic machine coils and not to their general structure. One skilled in the art may employ the methods of the present invention to any desired coil configuration. Application of the present invention is further described with reference to formation of stator coils for alternating current induction motors shown in FIGS. 1-3A.

DESCRIPTION OF PRIOR ART

Stator Coil Formation Methods

Figure 5:
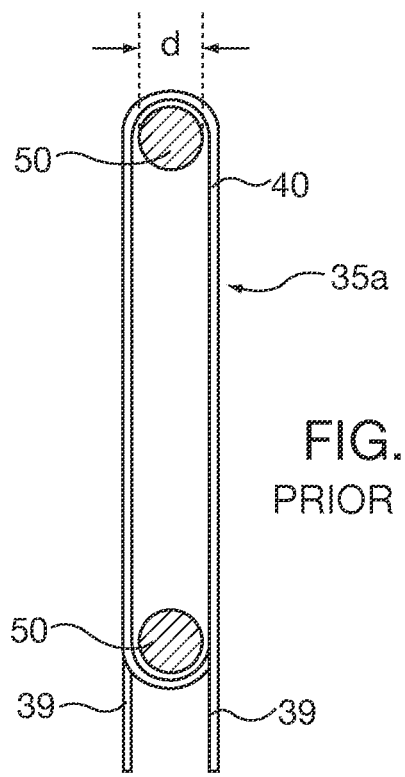
FIG. 5 is a schematic plan view of a prior art looped wire coil made that is used to form the stator coil of FIGS. 3 and 3A.

FIG. 4 is a flowchart of a typical known method for formation of the AC motor stator coil 35 of FIGS. 1-3A. In step 101, a strand of continuous, externally insulated ribbon wire 40 forms an elongated loop 35A around pins 50, shown in FIG. 5. The pins have an external diameter d, generally on the order of 1 inch (25 millimeters). In step 102, a layer of sacrificial protective tape (not shown) is applied to the elongated loop 35A by known techniques. Optionally prior to application of the sacrificial tape sections of the loop 35A that are intended to be formed into the straight final sections 36A, 36B those straight sectors may be wrapped with insulating tape intended to remain on the coil after final formation.

Figure 6A:
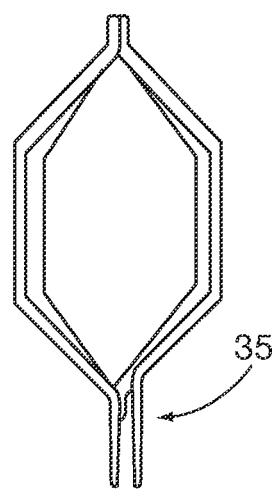
FIGS. 6A and 6B are respectively schematic plan and elevational views of the stator coil made by the prior art method of FIG. 4, prior to application of a final insulation layer necessary to construct the finished product of FIGS. 3 and 3A.
Figure 6B:
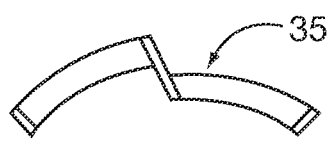

In step 103, the elongated loop 35A is inserted into heated press where the combination of heat and pressure consolidates and makes rigid the straight (or slot) portion of the coil. Then the coil is formed into its final three-dimensional shape shown in FIGS. 6A and 6B by known forming processes. When removed from the press, the loop 35A is allowed to cool. Thereafter it receives final bending and twisting to create the final profile shown in FIGS. 6A and 6B prior to completion of insulation processes. It is noted that the final formed shape profile conforms to the stator coil 35 shown in FIG. 3A. Referring to step 104, the sacrificial tape is then removed.

Next the loop 35A is prepared for insulation with wrapped tape using techniques well known in the art. At the discretion of the manufacturer any portion of the tape wrapping operations may be performed by hand or machine or a combination of both, depending upon the wrapping equipment available at the manufacturing facility. In step 105 the slot or straight portions 36A, 36B of the coil are wrapped by machine. The number of tape turns and coordination with resin application is set by manufacturer specification.

Upon completion of insulating the straight sections 36A, 36B, the remaining exposed sections of the stator coil 35 are insulated by hand in step 106. Such remaining sections may, for example, include the stator coil end portions 37A, 37B with the U bends 38A, 38B, and the leads 39. Optionally, an additional layer of external tape (not shown) may be added to the stator coil 35. Deposits of resin catalyzers may be applied at any time within the insulating steps 102-106 at the manufacturer's discretion.

DESCRIPTION OF THE PRESENT INVENTION

Stator Coil Formation Methods

As is readily apparent by review of FIG. 7, the stator coil formation method of the present invention is simpler than the prior art method of FIG. 4. This is possible due to the realization that final insulation layers including catalytic chemical compounds that are part of a multi-part epoxy resin catalytic material may be applied to the wire loop eventually forming the finished stator coil prior to the final forming and bending operations without damaging either the insulation layers or the coil wire strand insulation layer. The present invention formation methods provide for cost savings by: eliminating manufacturing steps; eliminating the need to apply temporary sacrificial tape prior to forming operations; and utilization of machine taping operations rather than hand taping operations.

Referring to FIG. 7, in step 201, the a strand of continuous, externally insulated ribbon wire 40 forms an elongated loop 35B around pins 50, as shown in FIGS. 8A and 8B. The pins utilized in the present invention have an external diameter D, generally on the order of 6-8 inches (150-200 millimeters), which is 6-8 times larger than that previously utilized in the prior art formation method of FIG. 4. The larger winding diameter allows application of machine taping operations for the entire loop 35B circumference, or any smaller portion thereof desired by the manufacturer. After formation of the loop 35B, coil lead portions 39 formed within the loop preferably are insulated in advance of other insulation operations.

In step 203 the entire flat loop coil 35B of FIGS. 8A and 8B is preferably machine taped about its circumference. Tape wrapping bias angle, tape tension, wrapping speed, etc., as in the prior art techniques, are chosen by the manufacturer without undue experimentation, depending on its internal specifications and capabilities of available taping machinery.

The insulating tape 44 and/or the wire bundle 35A is pre-treated with materials, such as catalytic chemical compounds, that are intended to react with the after-coated insulated resins. The catalytic chemical compound may be one or more parts of a multi-part epoxy resin insulation compound included with the insulating tape 44 by impregnation, coating or embedding processes. An exemplary catalytic chemical compound and insulating tape material combination is zinc napthenate impregnated in a mica-type insulating tape. The catalytic chemical compound accelerates curing of a multi-part epoxy insulation resin. Similarly, known additional techniques may be employed with the pre-treated insulating tape to assist with formation of the resin layer(s), including heat, pressure, catalytic chemical compounds, and activation ultra-violet light or other electromagnetic radiation excitation frequencies.

Figure 1:
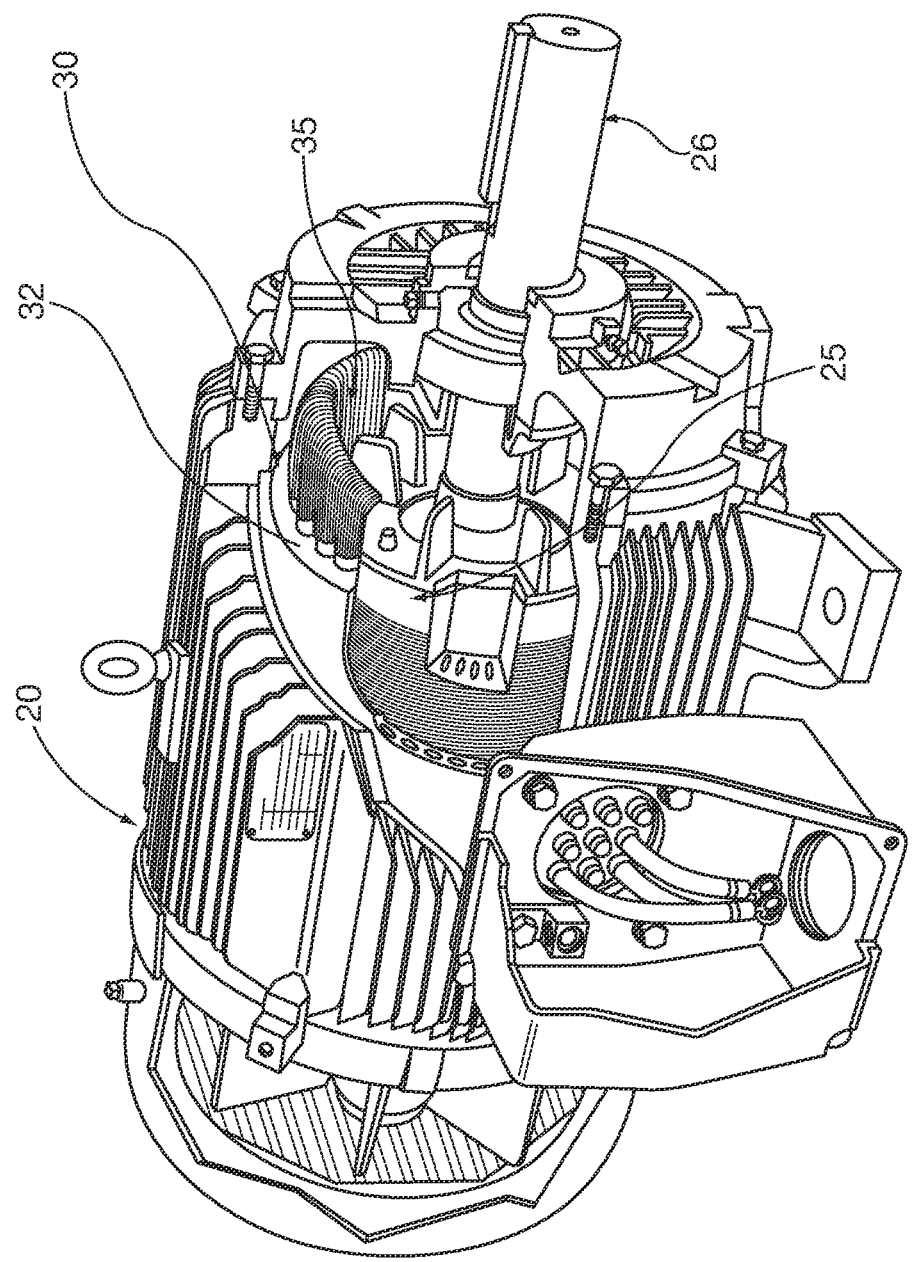
FIG. 1 shows a perspective view of a known electrodynamic machine alternating current induction motor partially cut away to show the stator ring, rotor and shaft.
Figure 2:
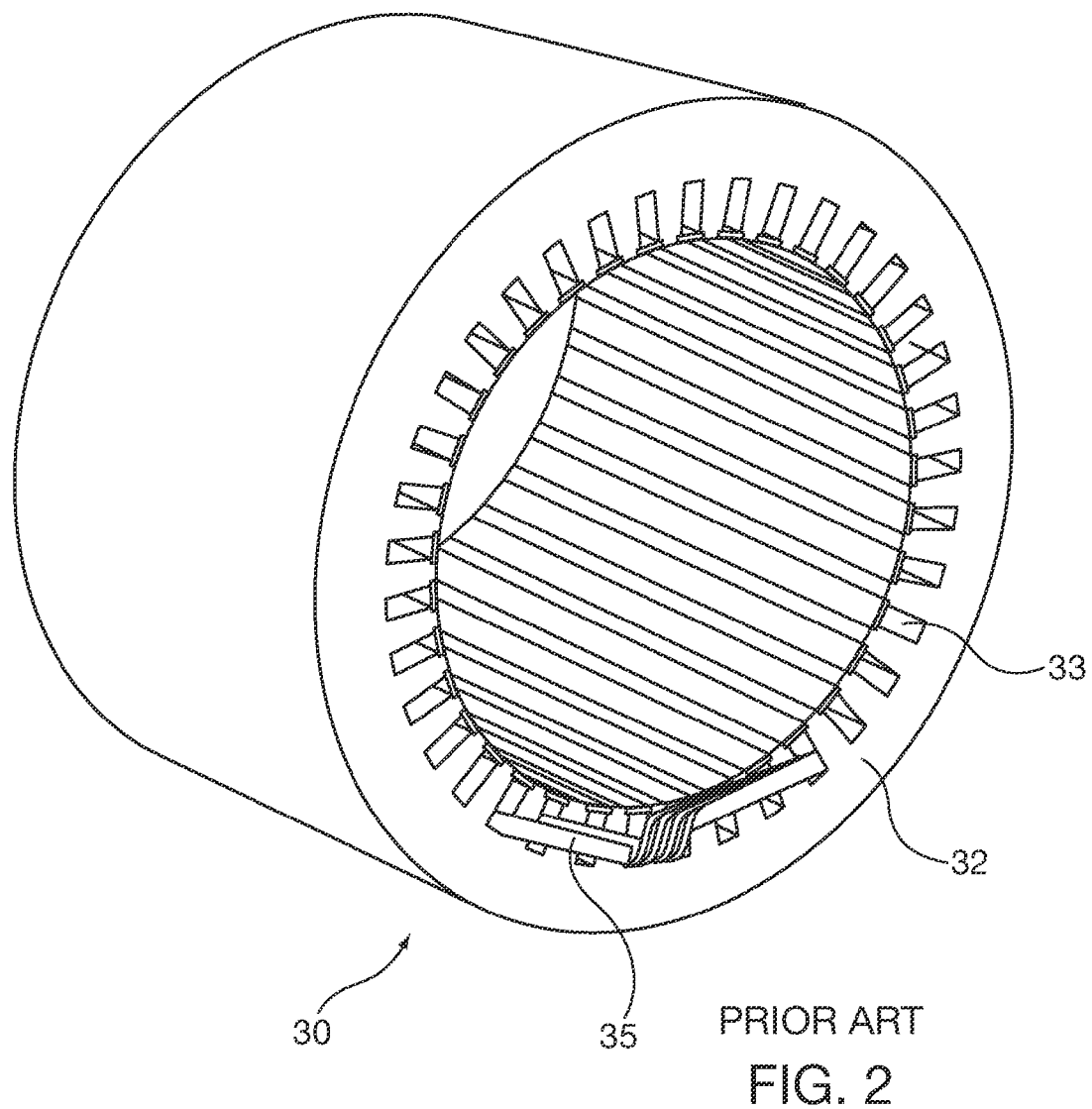
FIG. 2 is a perspective view cut away of the stator ring of FIG. 1.
Figure 3:
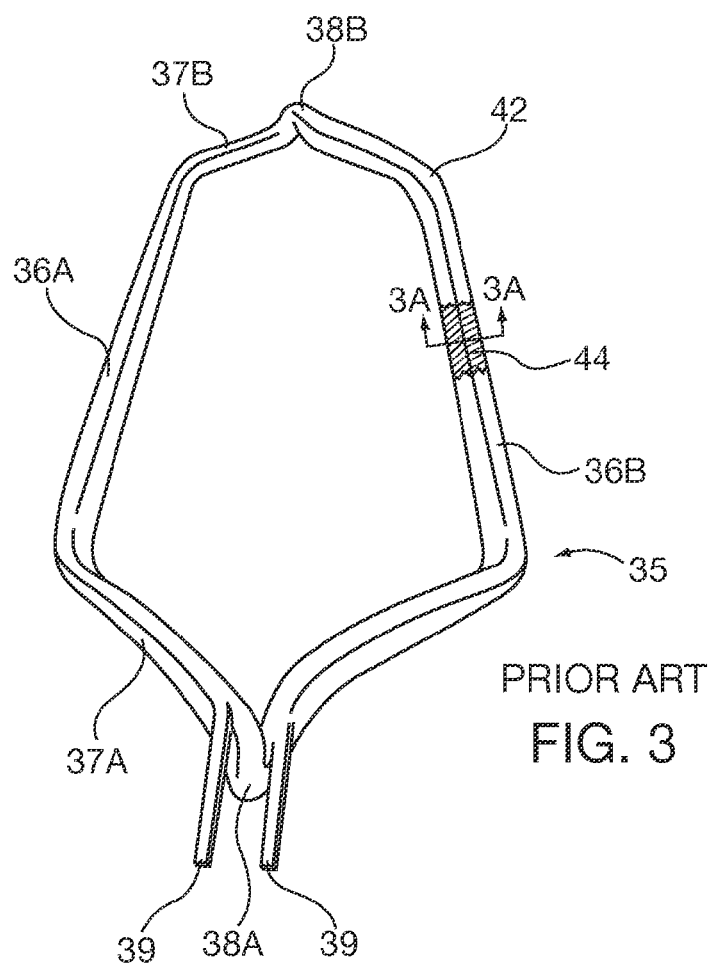
FIG. 3 is a perspective view of a stator coil of the motor of FIG. 1.
Figure 3A:
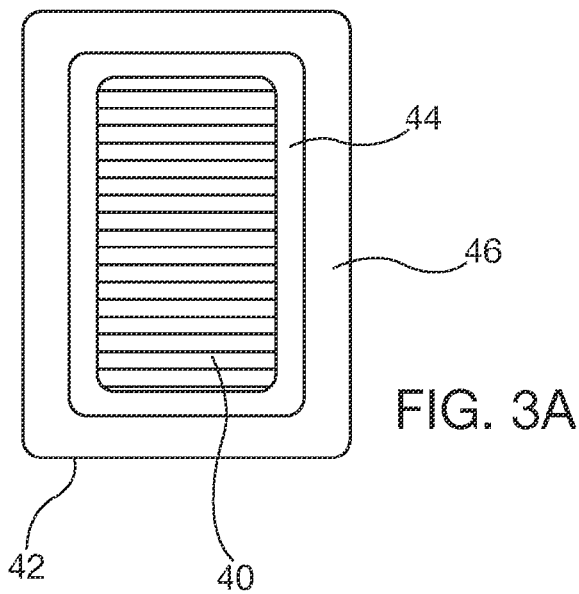
FIG. 3A is an elevational cross-sectional view of the stator coil of FIG. 3, taken along 3-3 thereof.

Next, in step 204 the large diameter, insulated wire loop 35B is placed in forming machinery to perform the bending and spreading steps necessary to conform the loop to its final intended configuration as a stator coil 35 of FIGS. 3 and 3A. The completed, taped stator coil 35 may be provided to a motor manufacturer for the latter's completion of insulative resin application. Additional resin impregnation steps may be performed before, during or after final forming operations of step 204. One skilled in the art may vary the forming operations without undue experimentation to determine subjectively its own optimal balancing of formation speed, number of forming die steps and protection of the tape layer(s) from mechanical damage during the formation process.

Although various embodiments which incorporate the teachings of the present invention have been shown and described in detail herein, those skilled in the art can readily devise many other varied embodiments that still incorporate these teachings.

What is claimed is:

1. A method for manufacturing an electrodynamic machine conductive coil, comprising:
    forming a continuous strand of insulation coated wire into a generally planar elongated closed loop having a circumference and an outer surface;
    machine wrapping a permanent insulation tape layer around at least a portion of the closed loop outer surface, the permanent insulation tape layer having thereon prior to said machine wrapping a catalytic chemical compound including at least one part of a multi-part epoxy resin;
    shaping the closed loop with the machine wrapped permanent insulation tape layer thereon, but without applying a temporary sacrificial tape over the machine wrapped permanent insulation tape layer prior to the shaping, by application of pressure into an insulated three-dimensional rigid electrodynamic machine conductive coil; and
    preparing the insulated three-dimensional rigid electrodynamic machine conductive coil for insertion into a pole slot of an electrodynamic machine without removing the machine wrapped permanent insulation tape layer that was present thereon during the shaping.

2. The method of claim 1, further comprising heating the closed loop prior to the shaping step.

3. The method of claim 1, further comprising applying additional insulation layers after the shaping step without removing any of the previously applied permanent insulation tape layer.

4. The method of claim 1, wherein, during the forming step, the wire is wound about at least two winding pins each having a diameter of at least 6 inches (150 millimeters).

5. The method of claim 1, wherein at least a portion of the closed loop circumference is insulated with the permanent insulation tape layer during the machine wrapping step.

6. The method of claim 1, wherein the entire closed loop circumference is insulated by the machine wrapped permanent insulation tape layer during the machine wrapping step.

7. The method of claim 1, wherein the conductive coil is an alternating current motor stator coil.

8. The method of claim 1, the catalytic chemical compound is applied to the permanent insulation tape layer prior to said machine wrapping by any one of impregnation, coating or embedding processes.

9. The method of claim 1, further comprising applying resin to the three-dimensional shaped coil without removing any of the previously applied permanent insulation tape layer.

10. A method for manufacturing alternating current motor stator coils, comprising:
    forming a continuous strand of insulation coated wire into a generally planar elongated closed loop having a circumference and an outer surface;
    applying a permanent insulation tape layer to the closed loop outer surface by spiral wrapping permanent insulating tape on at least a portion of the circumference with a tape wrapping machine, the permanent insulation tape layer having thereon prior to said wrapping a catalytic chemical compound including at least one part of a multi-part epoxy resin;
    shaping the closed loop with the machine wrapped permanent insulation tape layer thereon, but without applying a temporary sacrificial tape over the machine wrapped permanent insulation tape layer prior to shaping, by application of pressure into an insulated three-dimensional rigid conductive stator coil; and
    preparing the insulated three-dimensional rigid conductive coil for insertion into a pole slot of a stator without removing the machine wrapped permanent insulation tape layer that was present thereon during the shaping.

11. The method of claim 10, further comprising heating the closed loop prior to the shaping step.

12. The method of claim 10, further comprising applying additional insulation layers after the shaping step without removing any of the previously applied permanent insulation tape layer.

13. The method of claim 10, wherein, during the forming step the wire is wound about at least two winding pins each having a diameter of at least 6 inches (150 millimeters).

14. The method of claim 10, wherein the entire closed loop circumference is insulated by the machine wrapped permanent insulation tape layer during the applying step.

15. The method of claim 10, the catalytic chemical compound is applied to the permanent insulation tape layer prior to said machine wrapping by any one of impregnation, coating or embedding processes.

16. The method of claim 15, further comprising applying resin to the three-dimensional shaped coil without removing any of the previously applied permanent insulation tape layer.

17. The method of claim 10, further comprising applying resin to the three-dimensional shaped coil without removing any of the previously applied permanent insulation tape layer.

* * * * *